Patented July 27, 1926.

1,593,788

UNITED STATES PATENT OFFICE.

GÉZA AUSTERWEIL, OF BOULOGNE, AND LOUIS PEUFAILLIT, OF LILLE, FRANCE.

PROCESS FOR QUICK RETTING OF FLAX, HEMP, AND OTHER TEXTILE PLANTS.

No Drawing. Application filed July 3, 1925, Serial No. 41,431, and in France July 7, 1924.

Flax, hemp, ramie, nettle, etc., contain long and very strong fibres, which are obtained in free state from these plants through a process called retting. Before the application of this retting process, the flax plants are pulled out or cut, and the leaves and the seed are rippled. The remaining stalks are tied in bundles and put in water, either running or stagnant. This is retting. The stalks remain some days, even some weeks in water, and in this period, a sort of fermentation occurs; this fermentation transforms the product which causes the sticking of the textile fibres to the woody parts of the stalks (pectine and its derivatives). After this operation, the stalks are removed from the water, dried and submitted to various mechanical treatments, such as breaking and scutching, which separate the fibre from the woody part of the stalks. The fibre thus obtained, linen or hemp, etc., is a commercial products; it goes to spinning.

This somewhat oldish process has a series of drawbacks; the yield of the fibres is low; the fermentation, which yields acid products, causes deterioration of the fibre by diminishing its tensile strength; the retting process depends too much on the temperature and meteorological conditions; also, the goods are immobilized for a very long time.

There is, therefore, a marked advantage to treat the stalks of those textile plants with chemical processes giving a quicker retting and more uniform final goods. For this purpose, the boiling of the textile plants with alkaline or acid liquids has been proposed; the retting with the help of specially selected micro-organisms was proposed too, but no one of these processes gave definitively favorable results.

But it has been tried also to rot the stalks with water, to which some slight amount of petrol and soap had been added. In a general way, this last process was a marked progress. as compared to the old retting and to other chemical retting processes, for it gives a somewhat better yield in textile fibres and avoids their chemical deterioration; but the very long time of heating, (more than 8 hours) and the penetrating smell of the petroleum and of other hydrocarbons, which remain absorbed in the retted fibre long after the operation of retting, and the dark color of the resulting textiles hindered the spreading of this process. The waste waters too, with their pungent petrolic smell, incommodate also the surroundings of such a retting factory.

It has been found, that, if for petroleum is substituted in this sort of retting process an alcohol of high molecular weight, for instance, the hydrated cyclic alcohols such as cyclohexanol, methylcyclohexanol, torpineol, and by high boiling aromatic alcohols, as for instance, benzylic alcohol, and by heating the stalks of textile plants in an autoclave under a slight pressure which can be kept under 2 atmospheres, a perfect chemical retting can be realized.

Example: Flax straw is heated in an autoclave, in the water nearly filling it; the straw is completely immersed in form of bunds, with the help of a metallic basket. The heating reaches from 118° C. to 135° C.; the pressure does not exceed 1½–2 atmospheres. One per cent to 1½% of cyclohexanol, calculated on the weight of the flax straw, is added, and the whole liquid circulated with the help of a little centrifugal pump for 4 to 4½ hours, in order to ensure the perfect homogeneity of the bath. Temperature and pressure are maintained throughout this time. Finally, the stalks are removed and wrung, and dried; they show a most complete retting, towards the end of the heating period, a very small amount of soap, about ¼% of the weight of the flax straw, may be added, to facilitate the emulsion of the solvent. The textile fibres obtained after drying, breaking and scutching of the retted stalks, are white with a fine silky lustre, as to their tensile strength, very resisting, they divide easily, they are also quite odorless, as also is the process. The yield of saleable textile fibres is more than one third higher than the yield obtained with the older processes.

We claim:—

Retting process for textile plants, characterized by the fact, that the stalks of the textile plants are heated for some hours, immersed in water containing a slight amount of alcohols of a high molecular weight, such as cyclohexanol; and others, in an autoclave under pressure.

Signed at Paris in the county of Seine and State of France this twenty third day of June 1925 A. D.

GÉZA AUSTERWEIL.
LOUIS PEUFAILLIT.